United States Patent [19]

Ioannides

[11] Patent Number: 4,721,199
[45] Date of Patent: Jan. 26, 1988

[54] METHOD AND APPARATUS FOR ORIENTATING CAN ENDS

[75] Inventor: Andreas G. Ioannides, Begbroke, England

[73] Assignee: Metal Box plc, Reading, England

[21] Appl. No.: 936,233

[22] Filed: Dec. 1, 1986

[30] Foreign Application Priority Data

Dec. 17, 1985 [GB] United Kingdom ............... 8531053

[51] Int. Cl.⁴ .............................................. B65G 47/24
[52] U.S. Cl. .................................... 198/388; 198/394; 198/411; 198/416
[58] Field of Search ............... 198/388, 394, 400, 416, 198/803.12, 399, 411; 414/781

[56] References Cited

U.S. PATENT DOCUMENTS 2,631,714  3/1953  McCain ........................... 198/388
3,568,882  3/1971  Aidlin et al. ................. 198/388 X

FOREIGN PATENT DOCUMENTS 0051105  5/1982  European Pat. Off. ............ 198/394

Primary Examiner—Frank E. Werner
Assistant Examiner—Cheryl L. Gastineau
Attorney, Agent, or Firm—Burns, Doane, Swecker & Mathis

[57] ABSTRACT

Apparatus for orientating circular can ends having an eccentric aperture encompassing the geometric center of the can end comprises a supply stack for delivering can ends to a table and a first conveyor for moving can ends one by one to a first station at which the center of successive can ends is precisely located. Can ends are then engaged by fingers on a second conveyor and drawn along a support track. The dragging action of the fingers in co-operation with a guide causes the can ends to adopt a required orientation in which the center trails behind the finger from that part of the aperture most remote from the center.

11 Claims, 6 Drawing Figures

METHOD AND APPARATUS FOR ORIENTATING CAN ENDS

BACKGROUND OF THE INVENTION

The present invention relates to a method and apparatus for orientating circular can ends which have an eccentric aperture formed in the central portion thereof and in which the aperture encompasses the geometric centre of the can end. Can ends of this type are stamped out from a blank and are to be fitted, such as by snap fitting or moulding, with a plastics closure in the aperture. In order for the closure to be reliably fitted in the aperture it is essential that the can ends are delivered to the fitting or moulding machine in a specified orientation. The invention relates to a method and apparatus for achieving such orientation.

SUMMARY OF THE INVENTION

According to a first aspect of the invention there is provided apparatus for orientating circular can ends each having an eccentric aperture formed in the central portion thereof and encompassing the geometric centre of the can end, the apparatus comprising means for supplying a stream of like can ends one by one to a first station at which the geometric centre of each successive can end is located to receive an elongate finger mounted for movement such that the free end of the finger follows a path which passes through the geometric centre of the can end at the first station whereby the finger enters into the aperture in the can end; the path of the free end of the finger having a run which extends downstream of the first station, a support track for the can ends extending parallel to the run of the free end of the finger and along which each can end is drawn by the finger after it has entered and aperture in the can end, and means adjacent the support track positioned to engage each can end as it is drawn along the support track by the finger to cause the can end to pivot about the finger and to orientate the can end such that the geometric centre thereof trails behind the finger from that part of the aperture most remote from the geometric centre of the can end.

According to a second aspect of the invention there is provided a method of orientating circular can ends each having an eccentric aperture formed in the central portion thereof and encompassing the geometric centre of the can end, the method comprising the steps of (a) delivering can ends one by one to a first station at which the geometric centre of the respective can end is precisely located;

(b) causing an elongate finger to pass into the aperture of the can end located at the first station;

(c) moving the finger away from the station such that the can end is drawn away from the station by the finger;

(d) supporting the can end as it is drawn away from the station by the finger;

(e) engaging the can end as it is being drawn by the finger to cause it to pivot about the finger and thereby to adopt an orientation in which the geometric centre of the can end trails behind the finger from that part of the aperture most remote from the geometric centre of the can end.

BRIEF DESCRIPTION OF THE DRAWINGS

FIG. 5 is a detailed side view of the delivery station denoted B in

FIG. 3; and

DETAILED DESCRIPTION OF THE INVENTION

Figure 1:
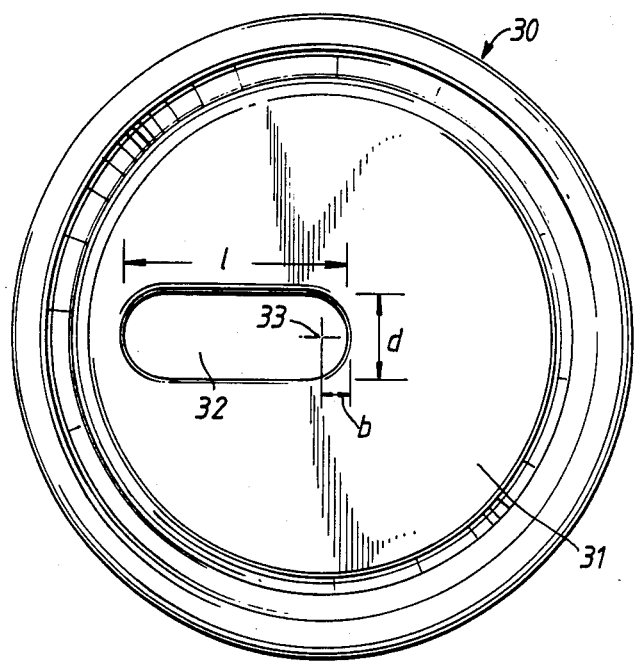
FIG. 1 is a plan view of a can end to be oriented.
Figure 2:
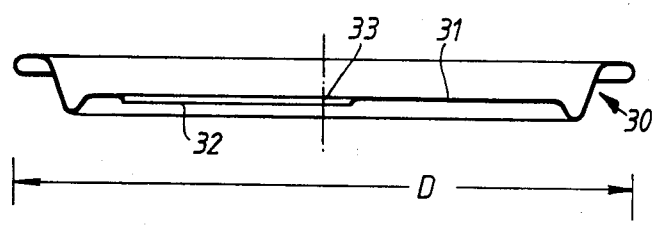
FIG. 2 is a cross-section through the can end of FIG. 1.
Figure 3:
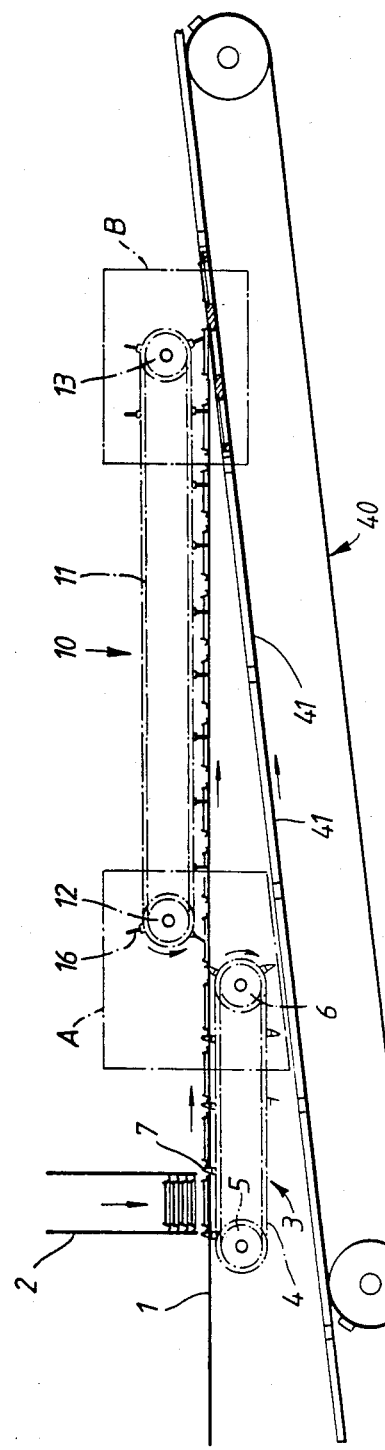
FIG. 3 is a schematic side elevation of apparatus for orientating can ends.
Figure 4:
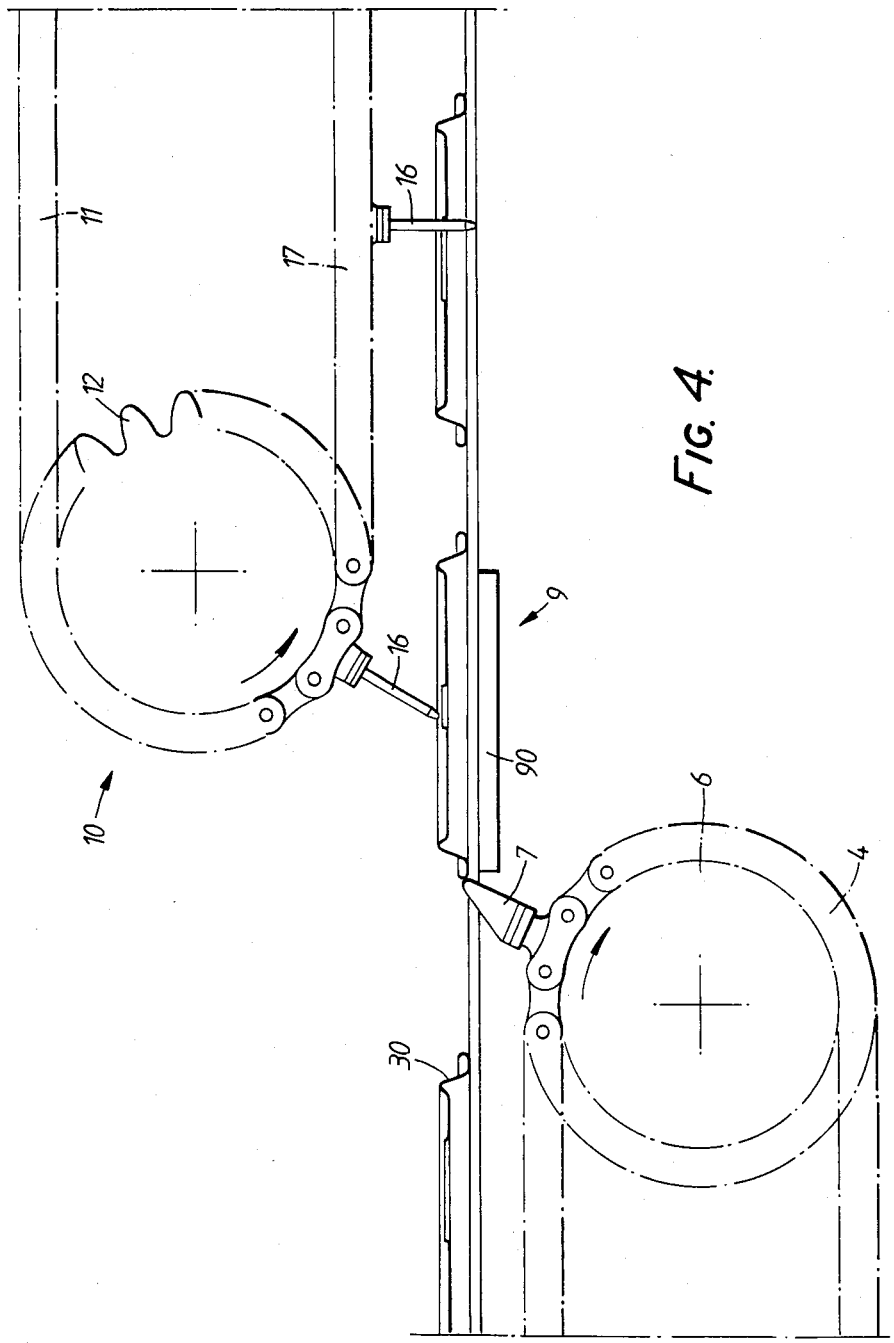
FIG. 4 is a detailed side view of the locating station denoted A in FIG. 3.
Figure 5:
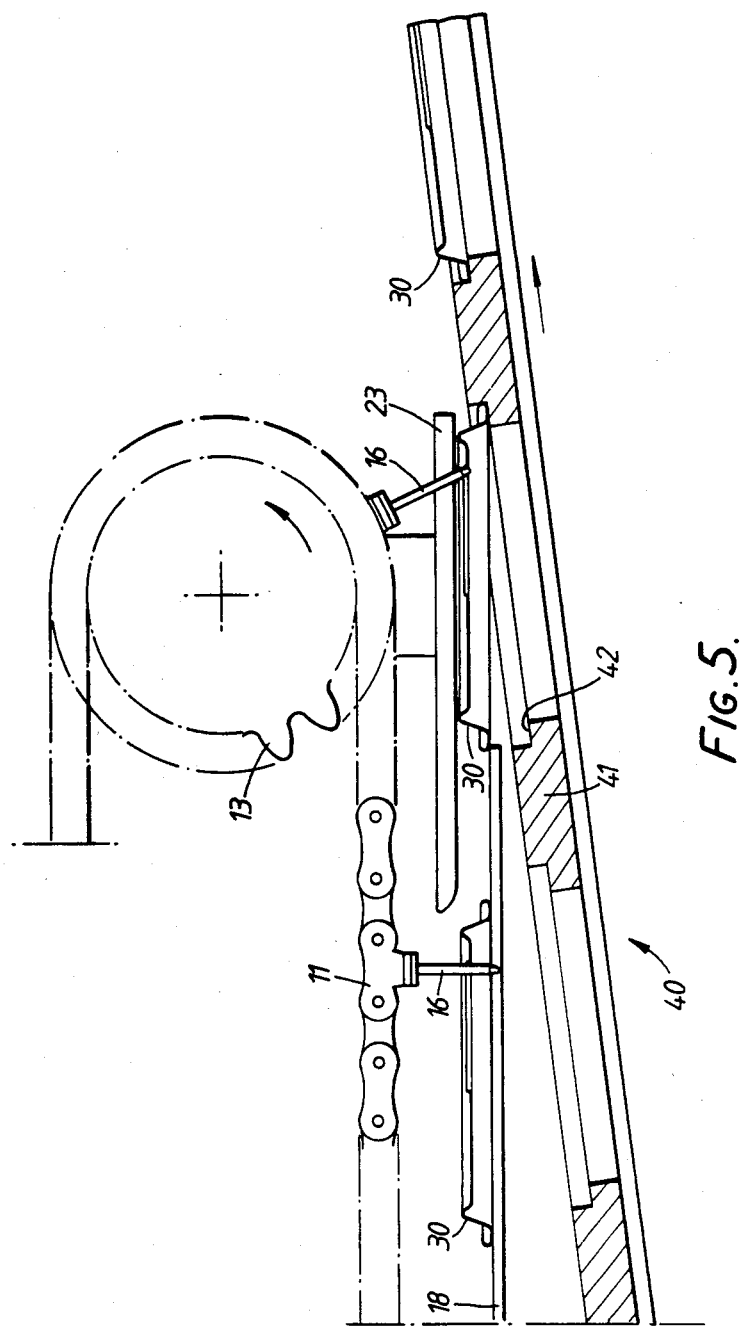
Figure 6:
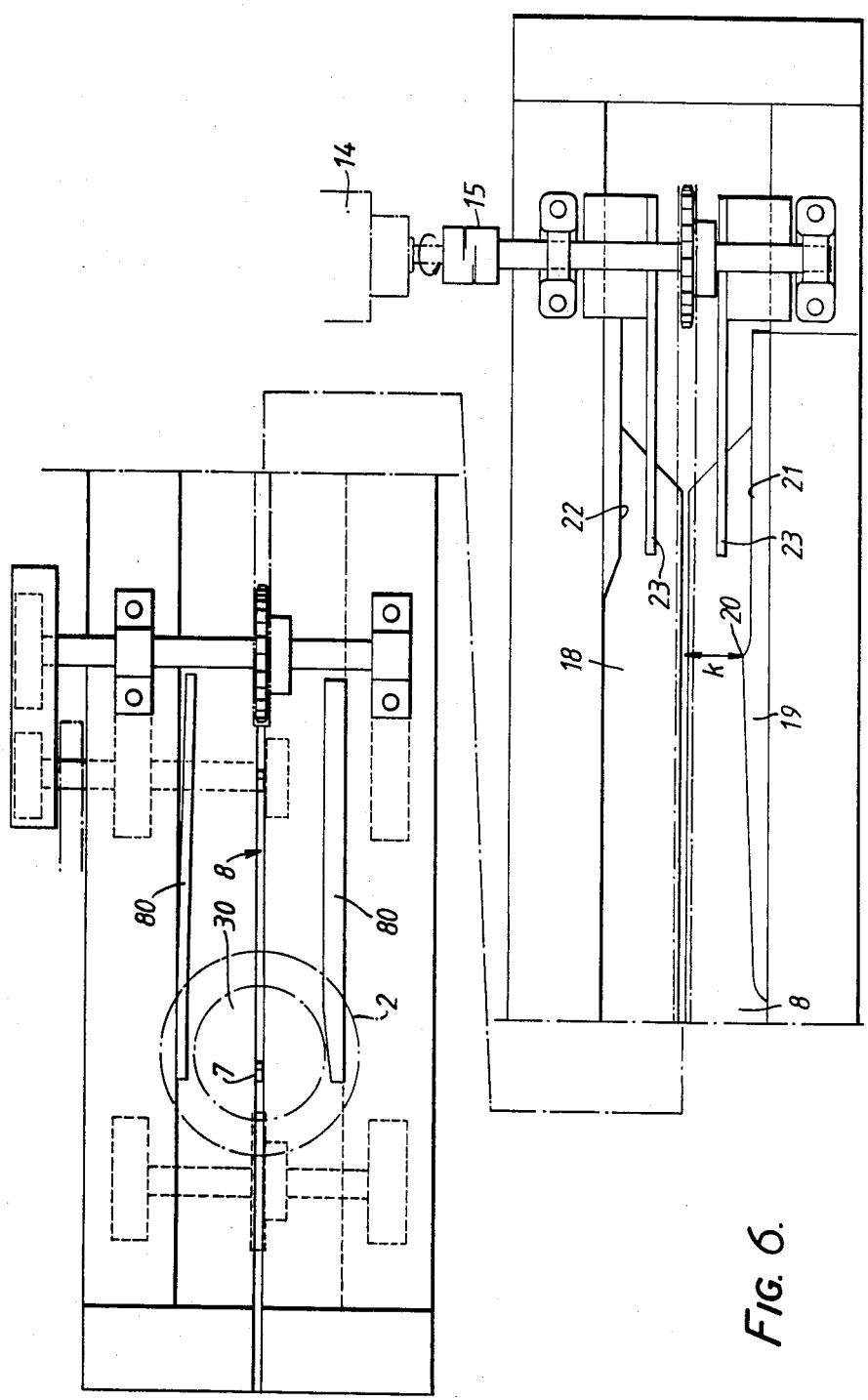
FIG. 6 is a plan view of the apparatus of FIGS. 3-6.

FIGS. 1 and 2, show an end 30 for a beverage can which has been stamped out from sheet metal. The end comprises a substantially planar central portion 31 in which an eccentric aperture 32 is formed. The aperture 32 encompasses the geometric centre 33 of the can end. The preferred dimensions of the can end are as follows:

Diameter of can end, D=72 mm
Length of aperture, l=21 mm
Width of aperture, d=11 mm
Distance between centre of can end and the nearer end of the aperture, b=3mm As shown in FIGS. 3-6 the apparatus for orientating can ends comprises a substantially horizontal table 1. Towards one end of the table, there is a vertical dispensing stack 2 containing a supply of can ends stacked one on top of the other. Beneath the stack is mounted a conveyor 3 comprising a feed chain 4 driven around a pair of horizontally spaced sprockets 5 and 6. The feed chain is provided with a number of spaced dogs 7 which run in a slot 8 (see FIG. 6) provided in the table 1 and which pick up can ends from the stack and convey them one by one along the table 1 in the direction from left to right of FIG. 1. The feed chain conveys can ends one by one to a first station 9 at which the geometric centre of the can end is precisely located. Guides 80 are mounted on the table either side of the slot 8 to help guide the can ends towards the first station 9. As shown in FIG. 6, at least one of these guides may be flexible and mounted to frictionally engage the can ends to reduce the momentum imparted to them by the dogs 7 so as to ensure that the can ends come to a halt as they arrive at the first station 9. Alternative means of arresting the can ends at the first station is shown in FIG. 4 where magnets 90 are positioned underneath the table 1 in the region of the first station 9. A second conveyor 10 mounted above the table 1 comprises an endless chain 11 mounted on sprockets 12 and 13. The second conveyor 10 is driven by a variable speed drive 14 through a flexible coupling 15; the conveyor 3 being connected to the conveyor 10 by a chain drive (not shown) so as to be driven in timed relation thereto. It will be understood that the drive connection between the conveyors will be arranged such that sprockets 6 and 12 rotate in opposite senses. A plurality of fingers 16 are mounted at equal spacings on the cnain 11 and extend at right angles to the chain; each finger being mounted on the chain in a manner allowing limited pivotal movement in the plane of the conveyor. The free ends of the fingers follow a path which is arranged such that the free end of a finger passing round the lower portion of sprocket 12 will enter into the aperture of a can end located at the first station 9. Subsequent movement of the finger along the lower run 17 of the conveyor 10 will cause the can end engaged by the finger to be drawn along the table 1. As shown in FIG. 4, the table is provided with a support and guide track 18 beneath the conveyor 10 which supports and guides each can end as it is drawn therealong by a finger 16. The support track has a slot running therealong into which the free ends of the fingers can pass. This slot is in practice a continuation of the slot 8.

Since the geometric centre of a can end is precisely located at the first station 9 the end of a finger 16 will automatically pass into the aperture which encompasses the geometric centre of the can end. The orientation of the eccentric aperture may, however, by in any radial direction about the geometric centre point. The action of the finger drawing a can end along the table will cause the can end to adopt a trailing position about the finger i.e. a position in which the aperture in the can end trails behind the finger. Two possible such trailing orientations are, however, possible. In the first position the pin will lie adjacent that part of the aperture remote from the geometric centre of the can end, but in the second position the finger will lie adjacent that part of the aperture nearest to the geometric center of the can end. Only the first of these positions is desirable since this is the only stable trailing position, and it is this orientation which it is desired to achieve. If a can end, on being picked up and drawn along the table by a finger, adopts the second possible position about the finger 16 it is necessary for this unstable equilibrium to be disturbed. As shown in FIG. 6, a tapered guide 19 is provided along one side of the track 18. Each can end is engaged by the guide 19 as it is drawn along the support and guide track 18, and is thereby disturbed from its equilibrium position; the track being wide enough to allow some lateral movement of the can ends. A can end which is being drawn along in the stable equilibrium position will return automatically to this position after it has passed the widest point 20 of the guide 19. A can end which is being drawn along in the unstable equilibrium position, however, will be caused to roll along the edge of the guide until it has rotated into the stable equilibrium position. The positioning and dimensions of the guide are selected to achieve this effect. It has been found that satisfactory results are achieved with can ends of the size described if the spacing k between the widest point 20 of the guide and the centre slot 8 is dimensioned to be as small as practicable without causing can ends to become jammed between the carrying finger 16 and the guide 19. The natural flexibility of the chain carrying the fingers 16 will also help to prevent any such jamming. The length of the guide 19 upstream of the point 20 should be long enough to permit a misoriented can end to roll along the guide until it adopts correct orientation. After passing the point 20, can ends are guided between guide surfaces 21 and 20 respectively formed on the guide 19 and a further guide 22 positioned on the opposite side of the track 18. The dimensions of the guide track can be adapted for use with can ends of different sizes. At the end of the lower run 17 of the conveyor 10 the fingers are retracted from their engagement with the can ends and the can end may then be conveyed in its final and desired orientation to a second station where a closure element can be fitted into the aperture by snap-fitting or moulding.

In the embodiment shown in FIGS. 3–6, a third conveyor 40 is mounted under the table 1 and inclined at an acute angle thereto. The conveyor 40 carries pallets 41 which are apertured to receive the can ends as they are fed off the end of the table 1. Guide rails 23 mounted above the track prevent the can ends from tilting until their trailing edges pass over the end edge of the track 18, at which point the can ends drp into seats 42 formed in the pallets 41. The end edge of the track has a V-profile to assist in the smooth transfer of can ends from teh track 18 to the seats 42. The seats 42 are magnetised to retain the can ends in their correct orientation. The third conveyor 40 is driven in timed relation with the second conveyor 11 such that the can ends drop precisely into the seats 42. Any small variations in the timing of the conveyor drives can, however, be absorbed by the flexibility of the mountings of the fingers 16 without deliterious effect.

It is envisaged that apparatus may be provided having four parallel track 8. In this case the pallets would be provided with a 4×4 array of seats for collecting the can ends and delivering them to a mould tool.

Using the apparatus described, can ends can be correctly orientated to within 5° of a required orientation. An error of this size can easily be corrected by a reciprocating locating pin, for example, in the mould tool.

I claim:

1. Apparatus for orientating circular can ends each having an eccentric aperture formed in the central portion thereof and encompassing the geometric centre of the can end, the apparatus comprising means for supplying a stream of like can ends one by one to a first station at which the geometric centre of each successive can end is located to receive an elongate finger mounted for movement such that the free end of the finger follows a path which passes through the geometric centre of the can end at the first station whereby the finger enters into the aperture in the can end; the path of the free end of the finger having a run which extends downstream of the first station, a support track for the can ends extending parallel to the run of the free end of the finger and along which each can end is drawn by the finger after it has entered the aperture in the can end and thereby orientated such that the aperture trails behind the finger either in a first stable position in which the finger is located in that part of the aperture remote from the geometric centre of the can end or in a second unstable position in which the finger is located in that part of the aperture nearest to the geometric center of the can end, and means adjacent the support track positioned to engage each can end as it is drawn along the support track by the finger to cause the can end to pivot about the finger so as to disturb can-ends orientated in the second unstable position and initiate their reorientation to the first stable position as the finger draws them along the support track.

2. Apparatus according to claim 1 wherein the means for supplying the can ends to the first station comprises an endless conveyor which collects can ends from a vertical supply stack and carries them along a horizontal run to the first station.

3. Apparatus according to claim 2 wherein a plurality of said fingers are mounted to extend at right angles from an endless element driven along a closed path in a vertical plane, and wherein the endless element is driven in timed relation to the endless conveyor such that successive fingers on the endless element enter the apertures of successive can ends at the first station.

4. Apparatus according to claim 1 wherein means are provided to cause the can ends to come to a halt as they arrive at the first station.

5. Apparatus according to claim 1 including means for delivering the orientated can ends toward a second station at which a closure element can be fitted into or formed in the apertures in the can ends.

6. Apparatus according to claim 5 wherein said means for delivering the orientated can ends toward a second station comprises a conveyor driven in timed relation with the fingers to receive the can ends.

7. A method of orientating circular can ends each having an eccentric aperture formed in the central portion thereof and encompassing the geometric centre of the can end, the method comprising the steps of
   (a) delivering can ends one by one to a first station at which the geometric centre of the respective can end is precisely located;
   (b) causing an elongate finger to pass into the aperture of the can end located at the first station;
   (c) moving the finger away from the station such that the can end is drawn away from the station by the finger and thereby orientated such that the aperture trails behind the finger either in a first stable position in which the finger is located in that part of the aperture remote from the geometric centre of the can end or in a second unstable position in which the finger is located in that part of the aperture nearest to the geometric centre of the can end;
   (d) supporting the can end as it is drawn away from the station by the finger;
   (e) engaging the can end as it is being drawn by the finger to disturb supported can-ends orientated in the second unstable position and initiate their reorientation to the first stable position as the finger draws them along.

8. A method according to claim 7 wherein the can ends are delivered to the first station from a vertical supply stack by means of a horizontal conveyor.

9. A method according to claim 7 in which the finger is moved along a closed path lying in a vertical plane.

10. A method according to claim 7 further comprising the steps of delivering the orientated can ends toward a second station at which closure elements can be fitted into or formed in the apertures in the can ends.

11. Apparatus for adjusting the angular orientation of a circular can end having an eccentric aperture therein which encompasses the centre of the can end, said apparatus comprising
    (a) a continuous chain supported on sprockets having at least one finger depending therefrom;
    (b) a support surface extending substantially parallel to the chain and supporting the can end for entry of said at least one finger into the eccentric aperture, so that the can end is drawn thereby along the support surface oriented either in a first stable position in which said at least one finger is located in a part of the aperture remote from the center of the can end or in a second unstable position in which said at least one finger is located in a part of the aperture near the center of the can end; and
    (c) a tapered guide extending alongside the line of travel of the can end so that, as the can end is drawn along the support surface, the can end rolls against the tapered guide whereby the can end is maintained in or reoriented to the first stable position.

* * * * *